United States Patent [19]

Iyoda et al.

[11] Patent Number: 4,820,245
[45] Date of Patent: Apr. 11, 1989

[54] POWER TRANSMITTING APPARATUS HAVING CHAIN RETAINING MEMBER

[75] Inventors: Hiroumi Iyoda; Hayashi Nakazawa, both of Katsuta, Japan

[73] Assignee: Hitachi, Ltd., Tokyo, Japan

[21] Appl. No.: 83,214

[22] Filed: Aug. 10, 1987

[30] Foreign Application Priority Data

Aug. 11, 1986 [JP] Japan .................. 61-186812

[51] Int. Cl.⁴ ........................................... F16H 7/08
[52] U.S. Cl. ................................. 474/140; 474/111
[58] Field of Search ............ 474/101, 111, 140, 144, 474/145, 151; 198/837, 841, 842

[56] References Cited

U.S. PATENT DOCUMENTS

| | | | |
|---|---|---|---|
| 1,308,570 | 7/1919 | Zanes ................................. | 474/111 |
| 4,492,304 | 1/1985 | Geis ................................. | 474/140 X |

FOREIGN PATENT DOCUMENTS

| | | | |
|---|---|---|---|
| 0205860 | 12/1986 | European Pat. Off. . | |
| 0260459 | 10/1970 | U.S.S.R. ............................. | 474/101 |
| 0889977 | 12/1981 | U.S.S.R. ............................. | 474/140 |
| 988238 | 3/1965 | United Kingdom . | |
| 985260 | 4/1965 | United Kingdom . | |

*Primary Examiner*—Thuy M. Bui
*Attorney, Agent, or Firm*—Antonelli, Terry & Wands

[57] ABSTRACT

An apparatus for transmitting power by a chain engaged with sprockets incorporates therein with a chain retaining member at a position at which the chain engages with one of the sprockets for maintaining the engagement between the chain and the one sprocket. With the provision of the chain retaining member, even if the chain becomes loose due to elongation with age, disengagement of the chain from the sprockets can be eliminated, resulting in a reduction in the frequency at which the chain tension must be adjusted.

10 Claims, 3 Drawing Sheets ll
POWER TRANSMITTING APPARATUS HAVING CHAIN RETAINING MEMBER

BACKGROUND OF THE INVENTION

1. Field of the Invention

The present invention relates to an apparatus for transmitting power by means of a chain, and more particularly, to an apparatus for transmitting power by means of a chain in which the chain is contacted with or wound on a sprocket over an angle not more than 180 degrees.

2. Description of the Prior Art

Apparatuses for transmitting power by means of a chain have been widely used as power transmitting apparatus in various industrial fields primarily because no slippage occurs between a chain and the associated sprockets. Such a chain drive is equipped with a chain tensioning device which applies a suitable magnitude of tension to the stretched chain and absorbs the slackness thereof.

The chain tensioning device of the type described above utilizes the force of a spring to put the chain in a suitably taut condition and to absorb its slankness at times when the degree of slackness is small. To cope with the slackness of the chain which is caused by its elongation with age, the magnitude of tension applied to the chain is adjusted so that it remains constant by periodically changing the position at which the chain tensioning device is installed. The operation of shifting the position at which the chain tensioning device is installed includes removal of a cover and disassembly of the parts arranged on the periphery of the power transmitting apparatus. This is a troublesome but necessary operation because without it a close engagement between the chain and the associated sprockets cannot be maintained and damage of the chain or the teeth of the sprockets will result if this work is neglected.

SUMMARY OF THE INVENTION

Accordingly, an object of the present invention is to provide an apparatus for transmitting power by means of a chain which enables the frequency at which chain tension adjusting work has to be carried out to be reduced.

The above-described object is achieved by providing in the apparatus chain retaining means at the position at which a chain is engaged with a sprocket for retaining the engagement therebetween.

With this structure, it is capable of maintaining a proper engagement between the chain and the sprocket, preventing the portion of the chain which is to be engaged with the sprocket from becoming separated therefrom. Even if the chain becomes loose owing to its elongation with age, no slippage will occur when an operation of the chain is started, thereby allowing the frequency at which the adjustment of the looseness of the chain is performed to be reduced.

DESCRIPTION OF THE PREFERRED EMBODIMENTS

Figure 1:
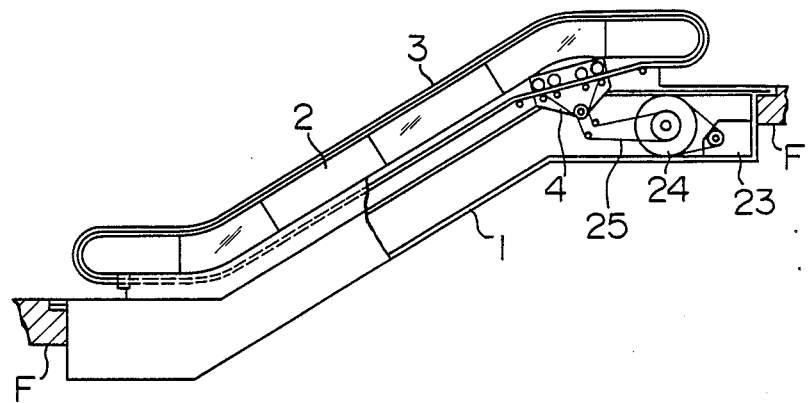
FIG. 1 is a side elevational view, with parts broken away, of an escalator provided with a handrail drive incorporating an apparatus of an embodiment of the present invention.

An embodiment of the present invention will be described below with reference to FIGS. 1 to 5, in which the apparatus for transferring power by means of a chain according to the embodiment of the present invention is applied to an escalator. Referring first to FIG. 1, a pair of balustrade panels 2 extend substantially over the entire length of a frame 1 laid between two floors F of a building. A plurality of moving steps are disposed between the pair of balustrade panels 2, although they are not shown. Each of the balustrade panels 2 guides a moving handrail 3 on its periphery. Each of the moving handrails 3 is driven by a handrail drive 4 disposed below the upper curved portion of each balustrade panel 2, i.e., the portion thereof where its upper horizontal portion meets its inclined portions. Each handrail drive 4, which is located on the lower side of each moving handrail 3, includes a fixed frame 5 fixed to the frame 1, and a movable frame 7 supported on the fixed frame 5 in such a manner as to be movable solely in the thicknesswise direction of the moving handrail 3. The fixed frame 5 is elongated in the longitudinal direction of the moving handrail 3, and rotatably supports four driven rollers 6a to 6d which guide the movement of the moving handrail 3. The movable frame 7 is a plate which is formed substantially in the shape of an inverted triangle. The movable frame 7 rotatably supports four driving rollers 8a to 8d above the handrail 3 in such a manner that they face the four driven rollers 6a to 6d through the handrail 3. The driving sprockets 9a to 9d are fixed on the shafts of the driving rollers 8a to 8d, respectively, on the sides thereof which are closer to the movable frame 7. A guide pin 10, which is elongated in the thicknesswise direction of the moving handrail 3, is mounted on the side of the fixed frame 5 which is closer to the movable frame 7. The movable frame 7 has bosses 11a, 11b attached thereto, and the guide pin 10 which passes through the bosses 11a, 11b is slidable therethrough solely in the longitudinal direction of the guide pin 10. A tongue 12 extends downward from the side of the fixed frame 5 which is closer to the movable frame 7, and an idler sprocket 13 is mounted on the tonque 12 through a position adjusting device 14. The position adjusting device 14 includes an L-shaped adjusting plate 14a which fixes the end of the shaft of the idler sprocket 13 which passes through a slot formed on the tonque 12, and an adjusting bolt 14b having a leading end which passes through the lower side of the adjusting plate 14a from below and which opposes the end of tonque 12. The lower portion of the movable frame 7 that is formed in the shape of an inverted triangle rotatably supports two coaxial idler sprockets 15, 16.

Figure 2:
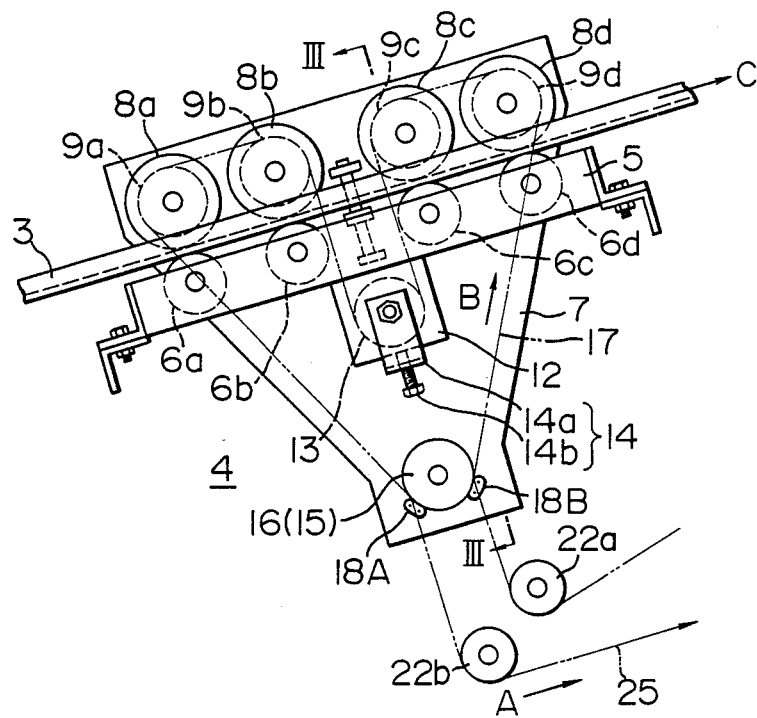
FIG. 2 is an enlarged view of the handrail drive shown in FIG. 1.
Figure 3:
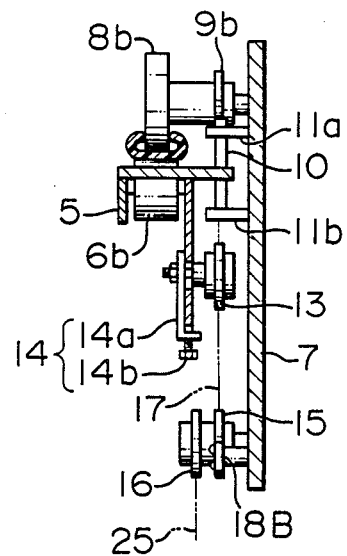
FIG. 3 is a sectional view of the handrail drive taken along the line III—III of FIG. 2.

A chain 17 extends over the sprockets, being contacted with or wound on the idler sprocket 15, the driving sprocket 9d, the driving sprocket 9c, the idler sprocket 13, the driving sprocket 9b and the driving sprocket 9a in that order, then returning to the idler sprocket 15. The chain 17 is wound on the idler sprocket 15 in such a manner that it extends upwardly and divergingly from the idler sprocket 15, as shown in FIG. 2. This means that the chain 17 is wound on the sprocket 15 over an angle not more than 180°, and that the chain 17 makes contact with the portion of the idler sprocket 15 which is below the axis of the latter. Adjacent to the portion of the chain 17 which contacts the idler sprocket 15 and at positions at which the contact of the chain 17 with the sprocket 15 begins and ends (on the tension side and slack side of the chain) are disposed two chain retaining members 18A, 18B. Each of the chain retaining members 18A, 18B, which are mounted on the movable frame 7, includes a retaining plate 19 having a length substantially corresponding to or spanning three chain rollers 17b, as well as a thickness which is slightly less than the width of the chain roller 17b, a spacing member 20 which determines the spacing between the retaining plate 19 and the movable frame 7, and fixing bolts 21. The unit of the chain 17 comprises two chain rollers 17b, two roller pins 17a which rotatably support the two chain rollers 17b, respectively, a pair of link plates 17c which support the two roller pins 17a at the same pitch as a pitch P of teeth 15c of the idler sprocket 15 in such a manner that the plates 17c do not interfere with the rotation of the chain rollers 17b, and connecting link plates 17d which connect the adjacent link plates 17c at the same pitch as the pitch P. The connecting link plates 17d pass the roller pins 17a therethrough and rotatably support them.

The retaining plate 19 is disposed such that a gap P exists between the chain rollers 17b and the retaining plate 19 when the chain rollers 17b engage with grooves 15b of the idler sprocket 15.

Below the idler sprocket 16 of the thusarranged handrail drive 4, the frame 1 rotabaly supports idler sprockets 22a, 22b. The frame 1 houses a driving device 23, and a reduction sprocket 24 driven by the driving device 23. A chain 25 extends over the sprockets, contacting with or wound on the reduction sprocket 24, the idler sprocket 22b, the idler sprocket 16 and the idler sprocket 22a in that order and then returning to the reduction sprocket 24, by means of which the handrail drive 4 is operated.

In the thus-arranged escalator, the moving steps (not shown) and the moving handrails 3 are driven simultaneously, ready for carrying passengers, by the operation of the driving device 23. Each of the moving handrails 3 is driven in the following manner: when the chain 25 engaging the reduction sprocket 24 is driven in the direction shown by an arrow A by the operation of the driving device 23, the idler sprocket 15 which is coaxial with the idler sprocket 16 is rotated so as to rotate the chain 17 in the direction shown by an arrow B. The rotation of the chain 17 in turn rotates the driving sprockets 9a to 9d. When the chain 25 is rotated, the tension thereof moves the movable frame 7 downward, pressing the driving rollers 8a to 8d against the moving handrail 3 on the driven rollers 6a to 6d. The moving handrail 3 is driven in the direction shown by an arrow C by the rotation of the driving rollers 8a to 8d and by the press thereof against the moving handrail 3.

In the thus-arranged escalator handrail drive 4, the chain 17 becomes slack due to its elongation with age when used for a long period of time. Such slackness is eliminated by adjusting the position adjusting device 14 and thereby shifting the idler sprocket 13 downward. However, adjustment of the position adjusting device 14 involves removal of the surface cover members of the escalator, and is therefore a troublesome operation.

In this embodiment, it is not necessary to immediately adjust the position adjusting device 14 when the chain 17 becomes loose, allowing safe operation of the escalator to continue. More specifically, ordinarily, the loose chain 17 tends to be separated from the idler sprocket 15, as shown by a dotted line 17' of FIG. 4, when its rotation is stopped, preventing power from being transmitted by means of the chain 17 when the chain is re-started. In this embodiment, however, the chain retaining members 18A, 18B located at positions at which contact of the chain 17 with the idler sprocket 15 begins and ends hold the chain 17 to be not separated from the idler sprocket 15 while the rotation of the chain is being suspended. The portion of the chain 17 which is located between the two chain retaining members 18A, 18B is not positively held or retained. However, it is kept engaged with the idler sprocket 15 so long as the portions of the chain 17 which face the chain retaining members 18A, 18B do not become disengaged from the idler sprocket 15.

In consequence, the loose chain 17 can be driven smoothly without any trouble when its rotation is started. Further, it is not necessary to adjust the looseness of the chain 17 by removing the surface cover members of the escalator. It is therefore possible to reduce the frequency at which chain tension (slackness) adjusting work has to be carried out.

The chain 17 which has become loose owing to elongation with age causes no problems in practice if the slackness of the chain 17 is within 2% of the pitch P of the roller pins 17a. Thus, it is preferable that the gap G between the chain rollers 17b and the retaining plate 19 is maintained within a range which allows the diameter D of a pitch circle to be increased by 2%.

Figure 4:
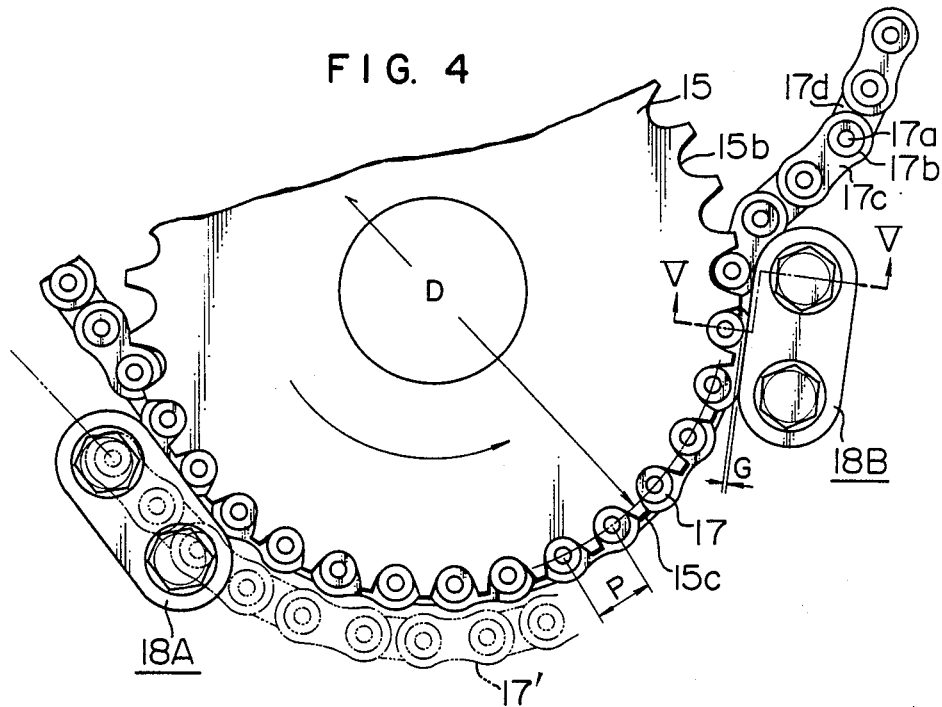
FIG. 4 is an enlarged view which illustrates a chain and a sprocket in their engaged state.
Figure 5:
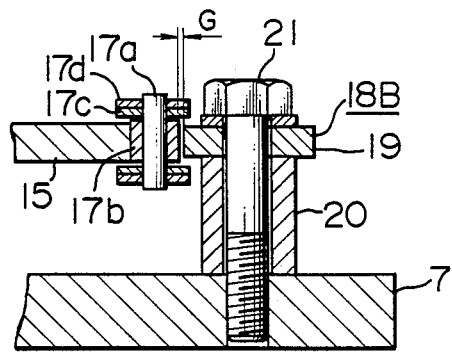
FIG. 5 is a cross-section taken along the line V—V of FIG. 4.

The retaining plate 19 of each of the chain retaining members 18A and 18B which is on the slack side of the chain 17 (on the side of the portion of the chain 17 at which the engagement thereof with the sprocket terminates) is always in contact with the chain 17. Therefore, it is preferable that at least that portion of the retaining plate 19 which makes contact with the chain 17 is made of a highly wear-resistant polymer such as a plastic to reduce the level of noise or degree of wear. The retaining plate 19 must be replaced if it becomes worn. However, if it is shaped into a symmetrical form, as shown in FIG. 4, the retaining plate 19, a portion or one lateral edge of which has been worn, may be re-used economically by re-arranging the same retaining plate 19 in such a manner that the other portion or lateral edge which has not been in contact with the chain 17 comes into contact therewith.

In this embodiment, the retaining plate 19 is constituted from a plate disposed in such a manner that it faces the chain rollers 17b which extend between the pair of link plates 17c. However, it may face the outer edges of the pair of link plates 17c and the connecting link plates 17d. Further, the retaining plate 19 need not be a plate.

In this embodiment, the chain retaining members 18A, 18B are mounted at positions where the engagement of the chain 17 with the idler sprocket 15 begins and ends. However, any number of the chain retaining member may be provided at any position between the start and end points of the engagement. For example, more than two chain retaining members may be mounted successively at positions between the start and end points of the engagement. Also it is possible to provide a single chain retaining member at a position between the start and end points of the engagement, as will be further described hereunder. In the latter case, it is effective that the single chain retaining member is provided at either the start point or the end point of the engagement. Further, it is possible to provide a single chain retaining member of arcuate form extending from the start point of the engagement to the end point thereof.

Figure 6:
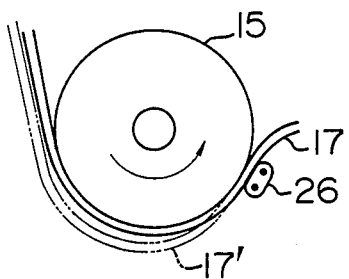
FIGS. 6 to 7 are schematic views of other embodiments of the invention.
Figure 7:
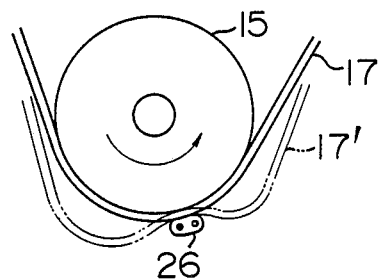

In this embodiment, the chain retaining members 18A, 18B are provided at positions at which the engagement of the chain 17 with the idler sprocket 15 begins and ends, respectively. However, it is possible to provide a single chain retaining member 26 at that portion of the chain 17 which engages with the idler sprocket 15, as shown in FIGS. 6 and 7. FIG. 6 illustrates the chain retaining member 26 disposed at the position at which the engagement of the chain 17 with the idler sprocket 15 terminates, for maintaining the engagement between the chain 17 and the idler sprocket 15 while the rotation of the idler sprocket 15 is suspended. More specifically, even if the loosened chain 17 engages with the idler sprocket 15 while the sprocket is being rotated in the direction shown by the arrow, it hangs below the idler sprocket 15, as the chain 17' shown by the broken lines, while the rotation of the idler sprocket 15 is suspended. However, the chain retaining member 26 maintains a portion of the chain 17' which is located on the side of the chain retaining member 26 engaged with the idler sprocket 15. As a result, when the idler sprocket 15 is rotated again, the chain 17' becomes engaged with the teeth of the idler sprocket 15, the engagement starting from the portion thereof which is on the side of the chain retaining member 26, and eventually the chain 17' reaches the state corresponding to the chain 17 by means of which power is transmitted.

FIG. 7 illustrates the chain retaining member 26 which is disposed substantially at the bottom of the idler sprocket 15. If the chain 17 is loose, it hangs below the idler sprocket 15, as the chain 17' shown by the broken lines, while the idler sprocket 15 is not being rotated. However, the chain retaining member 26 maintains a portion of the chain 17' engaged with the idler sprocket 15. As a result, when the rotation of the idler sprocket 15 is started, the chain 17' becomes engaged with the idler sprocket 15, the engagement starting from the portion of the chain 17' which is on the side of the chain retaining member 26, and spreading sequentially toward the start point of the engagement of the chain with the idler sprocket, and eventually the chain 17' reaches the state corresponding to the chain 17 by means of which power is transmitted. Thus, the disengagement of the chain 17 from the idler sprocket 15 can be eliminated, preventing the slippage of the chain 17, regardless of whether adjustment of the slackness by the position adjusting device 14 (see FIG. 2) is performed.

In the above-described embodiments, the invention has been applied to the handrail drive 4 of an escalator, with the chain retaining member 26 acting as a member for retaining the chain 17 to be engaged with the idler sprocket 15. However, the application is not limited the handrail drive 4 of the escalator and the present invention can be applied to other forms of chain drive.

As will be understood from the foregoing description, the apparatus for transmitting power by means of a chain according to this invention incorporates a chain retaining member at a position where a chain engages with a sprocket. It is therefore possible to continue to drive the chain without any problems, even if the chain becomes slack due to elongation with age. This enables a reduction in the frequency at which the chain tension must be adjusted.

What is claimed is:

1. A power transmitting apparatus including a first sprocket adapted to be driven and rotated;
   a second sprocket arranged at a location spaced apart from and above said first sprocket;
   a chain wound on said first sprocket and adapted to transmit power to said second sprocket;
   said chain being wound on said first sprocket in such a manner that the chain extends from upside toward said second sprocket and is returned toward said first sprocket to be wound on an area of said first sprocket below an axis of rotation of said first sprocket; and
   chain retaining means arranged at a location within said area for maintaining driving engagement between said chain and said first sprocket.

2. An apparatus for transmitting power by means of a chain according to claim 1, wherein said chain retaining means includes a chain retaining member arranged at a position at which the engagement of said chain with said sprocket terminates.

3. An apparatus for transmitting power by means of a chain according to claim 1, wherein said chain retaining means includes two chain retaining members disposed at positions at which the engagement of said chain with said one sprocket starts and ends, respectively.

4. An apparatus for transmitting power by means of a chain according to claim 1, wherein said chain retaining means is arranged between a pair of link plates of said chain in such a manner as to oppose a roller of said chain.

5. Apparatus as defined in claim 1 wherein said chain retaining means includes two chain retaining members disposed at a positions at which the engagement of the chain with said one sprocket starts and ends, respectively to maintain the chain in engagement throughout said area when rotation of the first sprocket is stopped.

6. Apparatus as defined in claim 1 wherein said chain comprises pins having rollers mounted thereon and spaced link retaining plates at opposite ends of said pins, and said chain retaining means has a width sufficiently narrow to fit between said link retaining plates of said chain and located sufficiently near a roller of said chain to prevent separation of said chain from said first socket.

7. An apparatus for transmitting power by means of a chain according to claim 6, wherein said chain retaining means includes a member which opposes said chain and is made of a polymer.

8. Apparatus as defined in claim 1 wherein an uppermost portion of the first sprocket is located below a lowermost position of the second sprocket and the chain retaining means is located to maintain the chain in driving engagement with said first sprocket to drive said second sprocket even when chain slack is sufficiently large to allow loss of driving engagement in the absence of said chain retaining means.

9. A handrail driving apparatus for passenger conveyors comprising a first sprocket mounted to be driven for rotational movement about an axis;
   second and third sprockets positioned at a location spaced horizontally apart from each other and on opposite sides of said first sprocket and connected to drive a hand rail for a passenger conveyor;

an uppermost portion of the first sprocket being below a line drawn between lowermost portions of the second and third sprockets;

a chain wound on an area of said first sprocket that is located below said axis and delivered in an upwardly moving direction to transmit power to and rotationally drive said second and third sprockets;

said chain being returned to said first sprocket through a return run from said third sprocket where chain slack occurs; and chain retaining means positioned at a location within said area for maintaining engagement between said chain and said first sprocket when rotation of said first sprocket is stopped even when chain slack is sufficiently large to allow loss of driving engagement, said chain retaining means being constructed and positioned so that when the first sprocket is again rotated, the chain remains engaged with said first sprocket to drive said second and third sprockets.

10. A handrail driving apparatus for passenger conveyors comprising:

a first sprocket mounted to be driven for rotational movement about an axis;

a second sprocket positioned at a location spaced apart from and above said first sprocket and connected to drive a handrail for a passenger conveyor;

a chain wound on an area of said first sprocket that is located below said axis and delivered in an upwardly moving direction to transmit power to and rotationally drive said second sprocket;

said chain comprising pins having rollers mounted thereon and spaced link retaining plates at opposite sides of said pins;

means returning said chain to aid first sprocket through a return run wherein chain slack occurs; and chain retaining means positioned in a location within said area for maintaining engagement between said chain and said first sprocket, said chain retaining means comprising a member of a polymer material having a width sufficiently narrow to fit between said link retaining plates of said chain and being located sufficiently near a roller of said chain to prevent separation of said chain from said first socket even when chain slack is sufficient to allow loss of driving engagement between the first sprocket and the chain when the first sprocket is stopped.

* * * * *